United States Patent
Tsai

(10) Patent No.: US 8,851,275 B2
(45) Date of Patent: Oct. 7, 2014

(54) SCREENING EXAMINATION SYSTEM AND METHOD

(75) Inventor: Tung-I Tsai, Taoyuan (TW)

(73) Assignee: Chan Li Machniery Co., Ltd., Taoyuan (TW)

(*) Notice: Subject to any disclaimer, the term of this patent is extended or adjusted under 35 U.S.C. 154(b) by 532 days.

(21) Appl. No.: 12/556,176

(22) Filed: Sep. 9, 2009

(65) Prior Publication Data

US 2011/0005894 A1 Jan. 13, 2011

(30) Foreign Application Priority Data

Jul. 9, 2009 (TW) .............................. 98123150 A

(51) Int. Cl.
  *B65G 21/14* (2006.01)
  *B65H 31/30* (2006.01)
  *B65G 47/64* (2006.01)
  *B26D 7/18* (2006.01)

(52) U.S. Cl.
  CPC .......... *B65H 31/3009* (2013.01); *B65G 47/642* (2013.01); *B65G 21/14* (2013.01); *B26D 7/18* (2013.01); *B65H 2301/42261* (2013.01); *B65H 2301/42264* (2013.01); *B65H 2404/254* (2013.01); *B65H 2404/2691* (2013.01)
  USPC .......................... 198/812; 198/594; 198/369.7

(58) Field of Classification Search
  USPC .............................. 198/369.1, 369.7, 588, 812
  See application file for complete search history.

(56) References Cited

U.S. PATENT DOCUMENTS

| 4,462,287 | A | * | 7/1984 | Weis et al. ..................... 83/104 |
| 5,277,297 | A | * | 1/1994 | Tolson ........................ 198/626.5 |
| 5,442,985 | A | * | 8/1995 | Ito ..................................... 83/155 |
| 6,082,733 | A | | 7/2000 | Borel |
| 6,371,304 | B2 | * | 4/2002 | Gambini ........................ 209/620 |
| 6,607,082 | B2 | * | 8/2003 | Biagioni et al. .............. 209/620 |
| 7,490,712 | B2 | * | 2/2009 | Hamers et al. ................ 198/588 |
| 8,167,136 | B2 | * | 5/2012 | Betti ............................. 209/620 |
| 2007/0272514 | A1 | * | 11/2007 | Hamers et al. ............. 198/369.7 |
| 2008/0060916 | A1 | * | 3/2008 | Whittlesey .................... 198/812 |

FOREIGN PATENT DOCUMENTS

| DE | 3446735 | | 6/1986 | |
| DE | 29704889 | | 8/1998 | |
| EP | 124177 | A1 * | 11/1984 | ............. B65G 47/51 |
| TW | 387413 | U | 4/2000 | |
| WO | WO 2009075005 | A1 * | 6/2009 | ............... B26D 7/18 |

* cited by examiner

*Primary Examiner* — William R Harp
(74) *Attorney, Agent, or Firm* — Rosenberg, Klein & Lee

(57) ABSTRACT

A screening examination system for screening and examining paper roll is disclosed to include a first conveyor unit, which comprises a first movable wheel set, a first drive wheel, a first fixed wheel and a first conveyor belt, a second conveyor unit, which comprises a second movable wheel set, a second drive wheel, a second fixed wheel and a second conveyor belt, and an examination unit, which examine test products and adjusts the relative positioning between the first movable wheel set and the second movable wheel set subject to examination result for enabling defective products to fall into the gap between the first conveyor unit and the second conveyor unit, accordingly, quality product to be delivered from the first conveyor unit to the second conveyor unit.

11 Claims, 11 Drawing Sheets

SCREENING EXAMINATION SYSTEM AND METHOD

BACKGROUND OF THE INVENTION

The present invention relates to a screening examination technology and more particularly, to a screening examination system which performs inspection and screening during conveying of test products. The invention relates also to a screening examination method using the screening examination system.

FIG. 1 illustrates a screening system according to the prior art. According to this design, the screening system 10 comprises a first conveyor unit 11, a second conveyor unit 13 arranged at the same elevation relative to the first conveyor unit 11 and kept apart from the first conveyor unit 11 at a gap 12, and a top conveyor unit 14 arranged above the first conveyor unit 11 and a second conveyor unit 13. The first conveyor unit 11 comprises a first drive wheel 111, a first driven wheel 113 and a first conveyor belt 15 wound around the first drive wheel 111 and the first driven wheel 113. The second conveyor unit 12 comprises a second drive wheel 131, a second driven wheel 133 and a second conveyor belt 17 wound around the second drive wheel 131 and the second driven wheel 133.

During application, the top conveyor unit 14, the first conveyor unit 11 and the second conveyor unit 13 are rotated to deliver test products 19. The first drive wheel 111 and the second drive wheel 131 are drive sources controlled to move the first conveyor belt 15 and the second conveyor belt 17, thereby delivering the test products 19. In actual practice, the transverse width L of the gap 12 is approximately equal to the width L1 of the test products 191. Thus the test products 191 that are carried forwards by the first conveyor belt 15 will be delivered to the second conveyor belt 17 subject to an inertia effect. Any test product 19 of which the transverse width L2 is smaller than the transverse width L of the gap 12 is regarded as a defective product 193. When one defective product 193 is being delivered by the first conveyor belt 15 toward the second conveyer belt 17, the defective product 193 will fall into the gap 12.

Further, there are limitations on the use of the aforesaid prior art screening system 10. For example, when the transverse width L2 of one defective product 193 is slightly smaller than the transverse width L of the gap 12, the defective product 193 may be delivered from the first conveyor unit 11 over the gap 12 to the second conveyor unit 13 due to the effect of inertia, subsequently, when one defective product 193 falls down as it is being delivered by the first conveyor belt 15 toward the second conveyer belt 17, the defective product 193 may be carried over the gap 12 to the second conveyer belt 17 regarding the effect of inertia as well, lowering the screening accuracy.

Therefore, it is desirable to provide a screening examination system and method that eliminates the aforesaid problem.

SUMMARY OF THE PRESENT INVENTION

It is, therefore, the primary object of the present invention to provide a screening examination system, which utilizes a first movable wheel set and a second movable wheel set and automatically adjusts the gap between the first movable wheel set and the second movable wheel set subject to the examination of an examination unit to judge each examined test product to be a defective product or quality product, achieving the purpose of screening of test products.

It is another object of the present invention to provide a screening examination system, which is practical for use to examine and screen paper products such as toilet paper roll, tissue paper, facial tissue or the like that processed through a cutting process, achieving the purpose of quality control.

It is still another object of the present invention to provide a screening examination system, which utilizes a sensor unit to detect test products and to control adjustment of the relative positioning between the first movable wheel set and the second movable wheel set of the system subject to the detection result.

It is still another object of the present invention to provide a screening examination system, which uses a respective drive wheel in each of the first conveyor unit and the second conveyor unit to rotate the respective conveyor belt and to control the speed of rotation of the respective conveyor belt.

It is still another object of the present invention to provide a screening examination system, which has a respective tension wheel set in each of the first conveyor unit and the second conveyor unit for adjusting the tension of the conveyor belt of the respective conveyor unit.

It is still another object of the present invention to provide a screening examination system, which utilizes multiple sensors of the sensor unit to detect the width, length and/or height of test products, achieving screening examination and saving system cost.

It is still another object of the present invention to provide a screening examination method for use in the screen examination system, which enables the first movable wheel set and the second movable wheel set to be moved relative to each other subject to the examination result of the examination unit, achieving examination and screening of test products and improving examination and screening efficiency.

To achieve the previous mentioned objects, the present invention provides a screening examination system, comprising: a first conveyor unit, said first conveyor unit comprising: a first drive wheel; a first tension wheel; a first fixed wheel; a first movable wheel set; and a first conveyor belt wound around said first drive wheel, said first tension wheel, said first fixed wheel and said first movable wheel set and rotatable to deliver test products upon rotation of said first drive wheel; a second conveyor unit, said second conveyor unit comprising: a second drive wheel; a second tension wheel; a second fixed wheel; a second movable wheel set; and a second conveyor belt wound around said second drive wheel, said second tension wheel, said second fixed wheel and said second movable wheel set and rotatable to carry test products from said first conveyor belt upon rotation of said first drive wheel; and an examination unit adapted to examine test products being delivered by said first conveyor unit and to adjust the relative positioning between said first movable wheel set and said second movable wheel set subject to the examination result.

Further, the present invention provides a screening examination method used in the screening examination system as claimed in claim 1, the screening examination method comprising the steps of: operating said first conveyor unit to deliver test products; operating said examination unit to examine test products being delivered by said first conveyor unit; and moving said first movable wheel set and said second movable wheel set toward each other for enabling test products that passed the examination of said examination unit to be delivered by said first conveyor unit to said second conveyor unit.

DETAILED DESCRIPTION OF THE PREFERRED EMBODIMENTS

Figure 1:
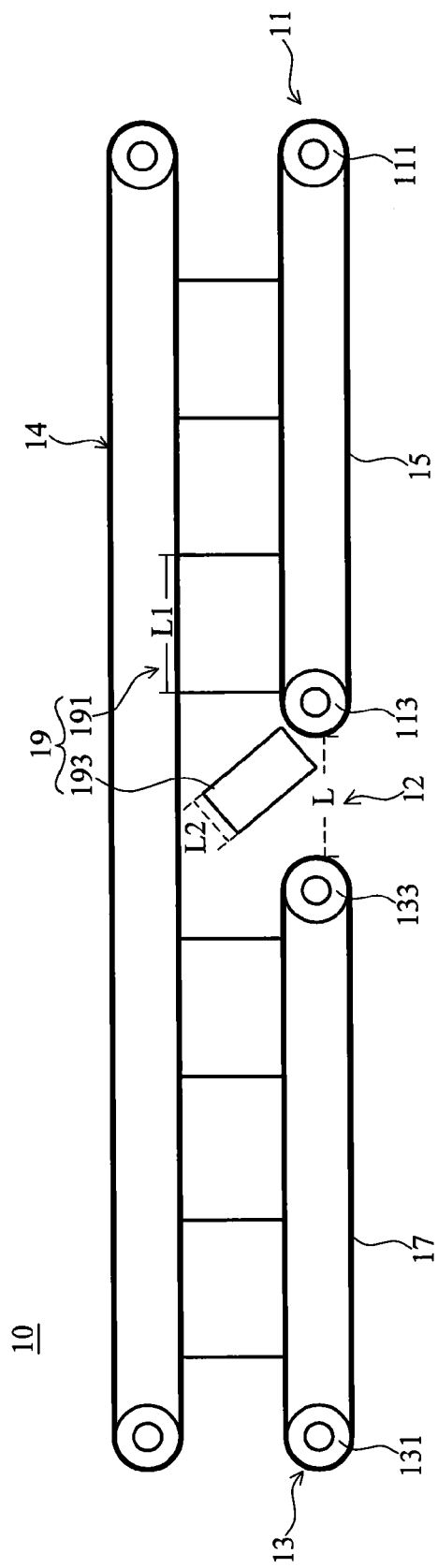
FIG. 1 is a schematic drawing showing the architecture of a screening system according to the prior art.
Figure 2:
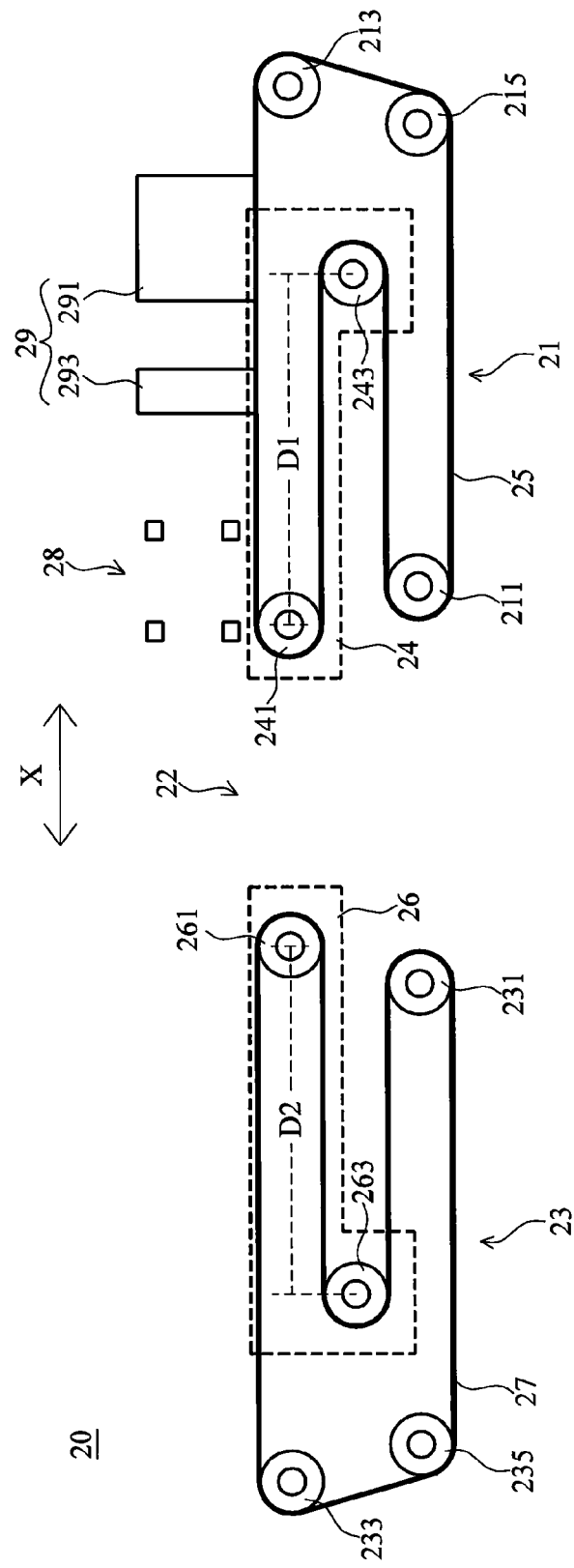
FIG. 2 is a schematic drawing showing the basic architecture of a screening examination system in accordance with the present invention.

Please refer to FIG. 2, a screening examination system 20 in accordance with the present invention is shown comprising a first conveyor unit 21 and a second conveyor unit 23. A gap 22 is defined between the first conveyor unit 21 and the second conveyor unit 23. Further, the first conveyor unit 21 and the second conveyor unit 23 are partially adjustable so that the size of the gap 22 can be adjusted.

According to one embodiment of the present invention, the first conveyor unit 21 comprises a first drive wheel 211, a first tension wheel 215, a first fixed wheel 213, a first movable wheel set 24 and a first conveyor belt 25. The first conveyor belt 25 is wound around the first drive wheel 211, the first tension wheel 215, the first fixed wheel 213 and the first movable wheel set 24.

The first drive wheel 211 is the man power source of the first conveyor unit 21. When the first drive wheel 211 is rotating, the first conveyor belt 25 is rotated to deliver test products 29.

The second conveyor unit 23 comprises a second drive wheel 231, a second movable wheel set 26, a second tension wheel 235, a second fixed wheel 233 and a second conveyor belt 27. The second conveyor belt 27 is wound around the second drive wheel 231, the second tension wheel 235, the second fixed wheel 233 and the second movable wheel set 26. The second drive wheel 231 is the main power source of the second conveyor unit 23. When the second drive wheel 231 is rotating, the second conveyor belt 27 is rotated to deliver test products 29.

The first movable wheel set 24 comprises a first movable wheel 241 and a third movable wheel 243. The distance D1 between the first movable wheel 241 and the third movable wheel 243 is fixed. The first conveyor belt 25 is wound around the first movable wheel 241 and the third movable wheel 243. When rotating the first conveyor belt 25, the first movable wheel 241 and the third movable wheel 242 are rotated.

The second movable wheel set 26 comprises a second movable wheel 261 and a fourth movable wheel 263. The distance D2 between the second movable wheel 261 and the fourth movable wheel 263 is fixed. The second conveyor belt 27 is wound around the second movable wheel 261 and the fourth movable wheel 263. When the second conveyor belt 27 is rotating, the second movable wheel 261 and the fourth movable wheel 263 are rotated.

The first movable wheel set 24 and the second movable wheel set 26 are movable. In one embodiment of the present invention, the first conveyor unit 21 and the second conveyor unit 23 are substantially arranged on one same plane such that the first movable wheel set 24 and the second movable wheel set 26 are movable along a first direction X.

The screening examination system 20 further comprises an examination unit 28 adapted to examine test products 29. The examination unit 28 can be comprised of an image sensor or a set of position sensors or photonic sensors to detect the length L, height H and/or width W of test products 29 and then to discriminate test products 29 into quality products 291 or defective products 293 subject to the detection result. Further, the positions of the first movable wheel set 24 and the second movable wheel set 26 can be relatively adjusted to change the size of the gap 22 between the first movable wheel set 24 and the second movable wheel set 26 subject to the detection result of the examination unit 28.

Further, the test products 29 can be toilet paper roll, tissue paper or facial tissue. These products are usually processed through a cutting process. After cutting, the cut pieces may be different in size, for example, front waste, tail waste and defective products may appear during each cutting operation. By means of the operation of the screening detection system 20, test products 29 are examined and discriminated into quality products or defective products, achieving test products quality control.

When one quality product 291 passed over the examination unit 28, the first movable wheel set 24 and the second movable wheel set 26 are moved toward each other for enabling the quality product 291 to be delivered by the first conveyor belt 25 to the second conveyor belt 27. On the contrary, when a detected product 293 passed over the examination unit 28, the first movable wheel set 24 and the second movable wheel set 26 are moved apart for enabling the defective product 293 to fall into the gap 22 between the movable wheel set 24 and the second movable wheel set 26. Thus, examination and screening of one test product 29 are done.

Figure 2A:
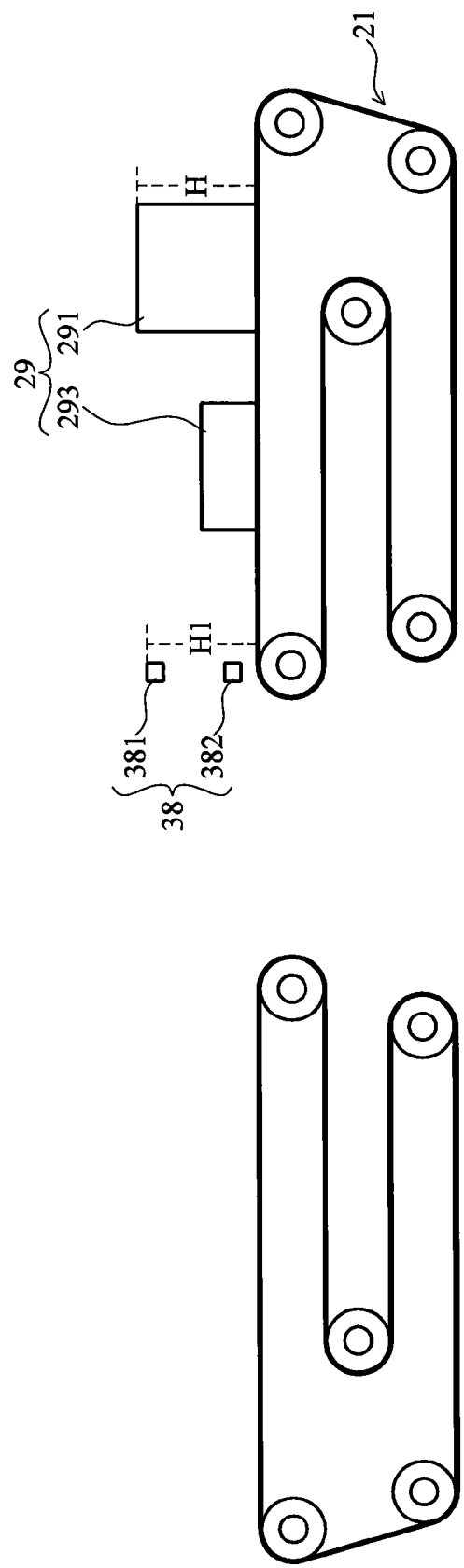
FIG. 2A is a schematic drawing showing a screening examination system arranged in accordance with one embodiment of the present invention.

In one embodiment as shown in FIG. 2A, a sensor unit 38 is arranged at one lateral side relative to the first conveyor unit 21 and adapted to examine the height H of test products 29. According to this embodiment, the sensor unit 38 comprises at least one first sensor 381 and at least one second sensor 382. The at least one first sensor 381 and the at least one second sensor 382 are vertically aligned. The elevation H1 of each first sensor 381 is slightly lower than the height H of quality products 291. The at least one second sensor 382 are arranged in proximity to the first conveyor belt 25. Thus, the at least one first sensor 381 examine the height H of each test product 29; the at least one second sensor 382 detect the presence of one test product 29.

Figure 2B:
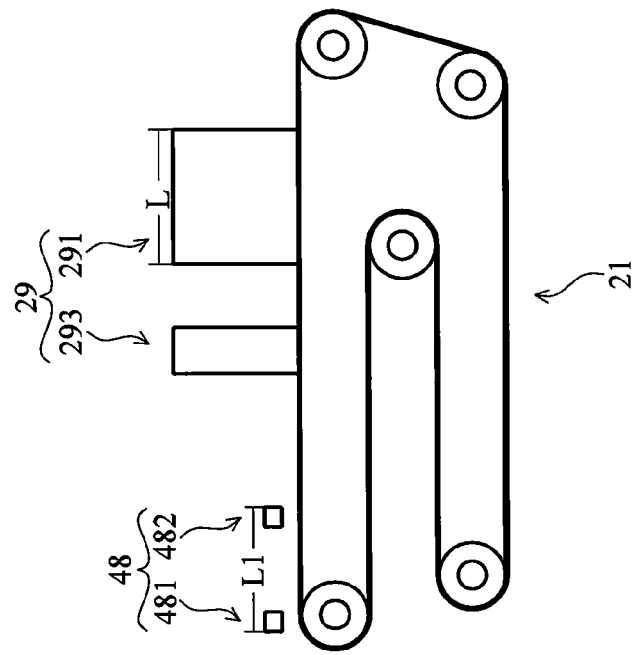
FIG. 2B is a schematic drawing showing the architecture of another alternate form of the screening examination system in accordance with the present invention.

In another embodiment of the present invention, as shown in FIG. 2B, a sensor unit 48 is arranged at one lateral side relative to the first conveyor unit 21 and/or above the first conveyor unit 21 to examine the length L of test products 29. According to this embodiment, the sensor unit 48 comprises at least one first sensor 481 and at least one second sensor 482. The at least one first sensor 481 and the at least one second sensor 482 are substantially arranged at one same elevation in such a manner that the distance L1 between the at least one first sensor 481 and the at least one second sensor 482 is slightly shorter than the length L of test products 291. Thus, the at least one first sensor 481 and the at least one second sensor 482 can examine the length L of test products 29.

Figure 2C:
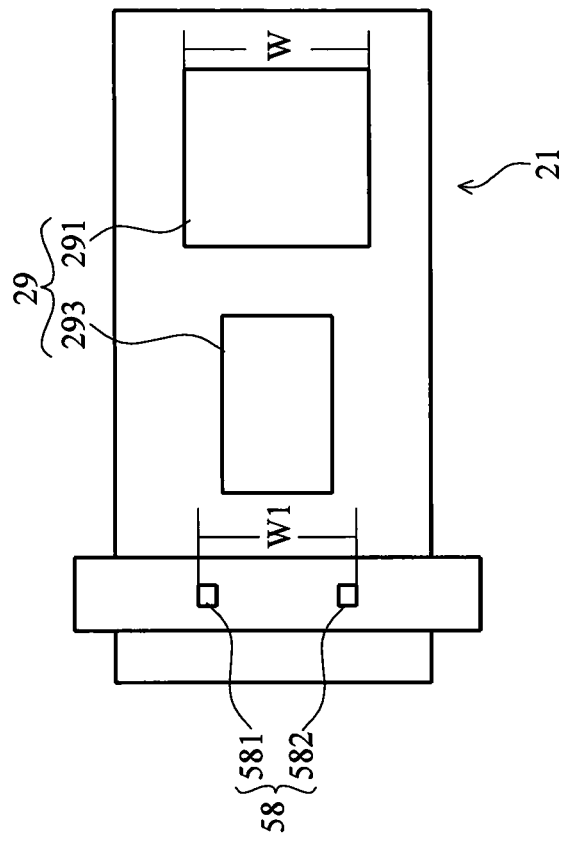
FIG. 2C is a schematic top view of the screening examination system shown in FIG. 2B.

Further, in still another embodiment of the present invention, as shown in FIG. 2C, a sensor unit 58 is arranged above the first conveyor unit 21 and adapted to examine the width W of test products 29. According to this embodiment, the sensor unit 58 comprises at least one first sensor 581 and at least one second sensor 582. The distance W1 between the at least one first sensor 581 and the at least one second sensor 582 is slightly shorter than the width W of one quality test product 291. Thus, the at least one first sensor 581 and the at least one second sensor 582 examine the width W of test products 29. During actual application, the examination unit 28 of the screening examination system 20 can be used with either one of the sensor units 38/48/58 shown in FIG. 2A, FIG. 2B and FIG. 2C or their combination to examine the height H, length L and/or width W of test products 29.

Figure 3:
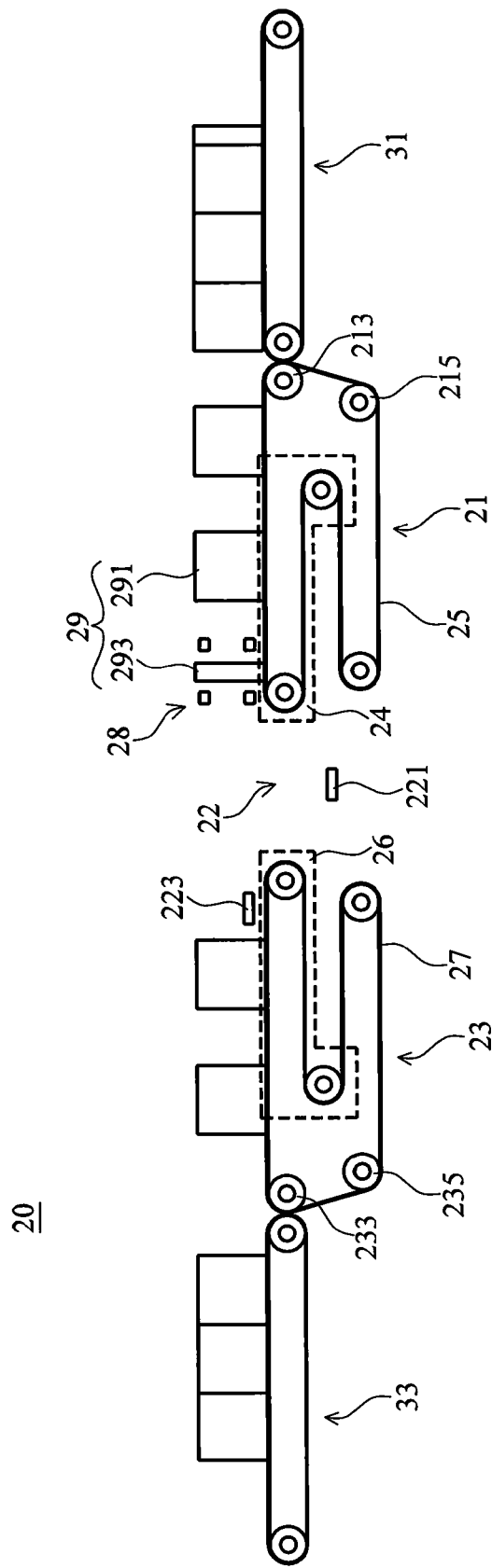
FIG. 3 is a schematic drawing showing the architecture of still another alternate form of the screening examination system in accordance with the present invention.

In still another alternate form of the present invention, as shown in FIG. 3, the screening examination system 20 comprises a first conveyor unit 21 and a second conveyor unit 23. The first conveyor unit 21 and the second conveyor unit 23 are connected together. The first conveyor unit 21 is connected to a test product feed unit 31. The second conveyor unit 23 is connected to a quality product output unit 33.

According to the embodiment shown in FIG. 3, the first conveyor unit 21 comprises a first fixed wheel 213, a first tension wheel 215, and a first conveyor belt 25 wound around the first fixed wheel 213 and the first tension wheel 215. The position of the first fixed wheel 213 is fixed. By means of the first fixed wheel 213, the first conveyor unit 21 is connected to the test product feed unit 31. The position of the first tension wheel 215 can be fixed. Alternatively, the position of the first tension wheel 215 can be fixed to adjust the tension of the first conveyor belt 25.

The second conveyor unit 23 comprises a second fixed wheel 233, a second tension wheel 235, and a second conveyor belt 27 wound around the second fixed wheel 233 and the second tension wheel 235. The position of the second fixed wheel 233 is fixed. By means of the second fixed wheel 233, the second conveyor unit 23 is connected to the quality product output unit 33. The position of the second tension wheel 235 can be fixed. Alternatively, the position of the first tension wheel 235 can be fixed to adjust the tension of the second conveyor belt 27. Further, a first sensor unit 221 can be selectively arranged between the first conveyor unit 21 and the second conveyor unit 23. The first sensor unit 221 can be comprised of position sensor means or photonic sensor means to detect falling of a test product 29 into the gap 22.

In actual application, the operation speeds of the first conveyor unit 21, second conveyor unit 23, test product feed unit 31 and quality product output unit 33 can be relatively adjusted subject to different requirements. For example, the operation speed of the first conveyor unit 21 and the operation speed of the second conveyor unit 23 can be approximately equal, facilitating delivery of one test product 29 from the first conveyor unit 21 to the second conveyor unit 23.

The operation speed of the first conveyor unit 21 can be faster than the test product feed unit 31 so that when test products 29 are delivered out of the test product feed unit 31 to the first conveyor unit 21, test products 29 are automatically kept apart from one another at a predetermined pitch, facilitating examination of the test products 29 by the examination unit 28.

The operation speed of the second conveyor unit 23 can be faster than the quality product output unit 33 so that test products 29 (quality products 291) that passed the examination are closed arranged in line one the quality product output unit 33 to facilitate further packaging.

Further, the embodiment shown in FIG. 3, a gap 22 is defined between the first conveyor unit 21 and the second conveyor unit 23, and at least one first sensor unit 221 is set in the gap 22 to detect falling of a test product 29 (defective product 293) into the gap 22. Subject to the detection result, the relative positioning between the first movable wheel set 24 and the second movable wheel set 26 is adjusted. For example, when the first sensor unit 221 detected passing of one defective product 293, it gives a signal to move the first movable wheel set 24 and the second movable wheel set 26 toward each other, facilitating delivery of quality products 291 from the first conveyor unit 21 to the second conveyor unit 23.

Further, an extra second sensor unit 223 may be arranged at one lateral side relative to or above the second conveyor unit 23. The second sensor unit 223 can be comprised of photonic sensor means or position sensor means adapted to examine test products 29 carried by the second conveyor unit 23. During application, the position of the first movable wheel set 24 and the position of the second movable wheel set 26 are relatively adjusted subject to the examination result of the sensor unit 28 and the detection result of the first sensor unit 221 and the detection result of the second sensor unit 223.

Referring to FIGS. 4A through 4E, the screening examination operation of the screening examination system is described hereinafter. As illustrated, the first conveyor unit 21 of the screening examination system 20 delivers test products 29 toward the second conveyor unit 23, and the position of the first movable wheel set 24 and the position of the second movable wheel set 26 are moved relative to each other subject to the examination result of the examination unit 28, thereby achieving examination and screening of test products 29.

Figure 4A:
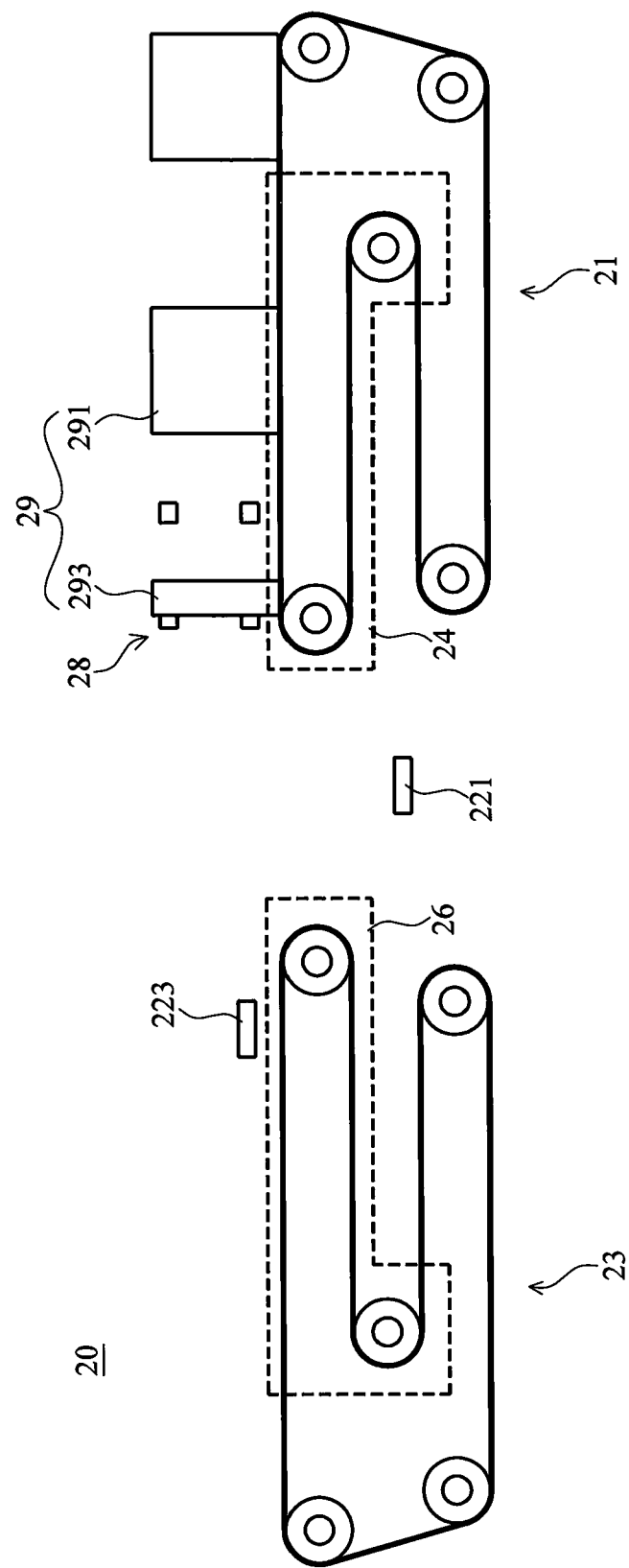
FIGS. 4A~4E are flow charts, showing the performance a screening examination method in accordance with present invention.

For easy understanding of the present invention, the first movable wheel set 24 and the second movable wheel set 26 are kept apart at the initial point of the operation. At first, the first conveyor unit 21 is operated to deliver test products 29, and at the same time the examination unit 28 that is provided at one lateral side or above the first conveyor unit 21 examines the test products 29, as shown in FIG. 4A.

Figure 4B:
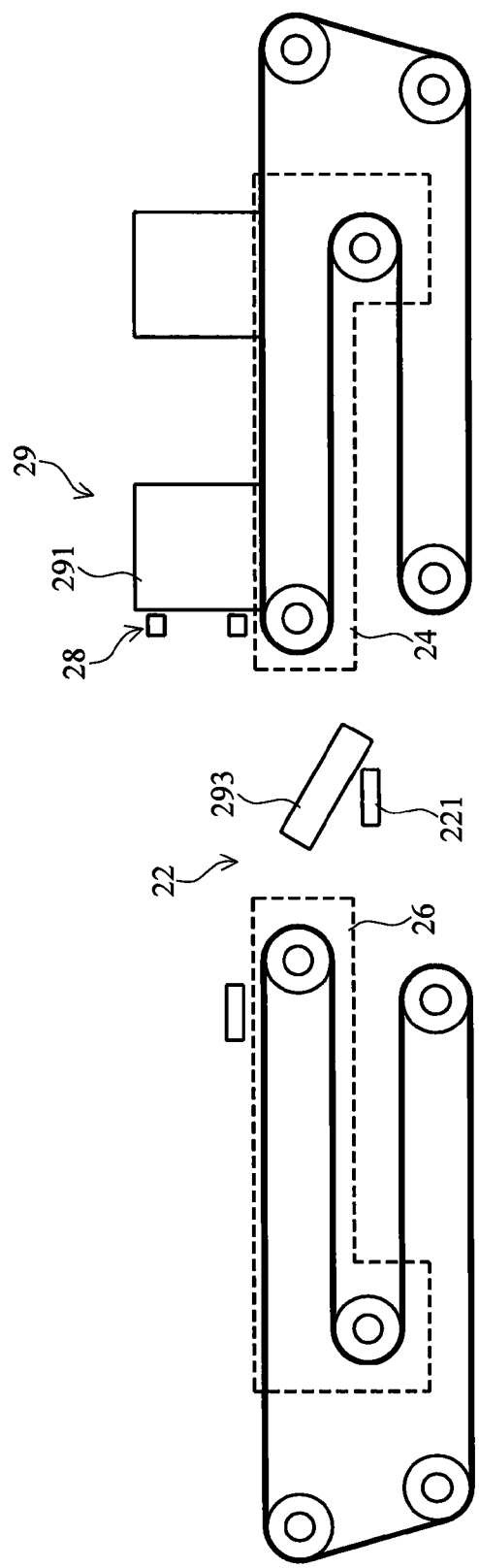

When one test product 29 is examined by the examination unit 28 to be a defective product 293, the first movable wheel set 24 and the second movable wheel set 26 are kept apart, enabling the defective product 293 to fall into the gap 22, and then the examination unit 28 keeps examining one next test product 29, as shown in FIG. 4B.

When one test product 29 is examined by the examination unit 28 to be a quality product 291, the first movable wheel set 24 and the second movable wheel set 26 are moved into connection with each other. According to this application example, the first movable wheel set 24 is moved toward the second movable wheel set 26 and then connected thereto for enabling each quality product 291 to be delivered from the first conveyor unit 21 to the second conveyor unit 23, as show in FIG. 4C. Further, when moving the first movable wheel set 24 toward the second movable wheel set 26, the speed of the first drive wheel 211 and first conveyor belt 25 of the first conveyor unit 21 is adjusted, preventing falling of the quality product 291 from the first conveyor unit 21 into the gap 22.

Figure 4C:
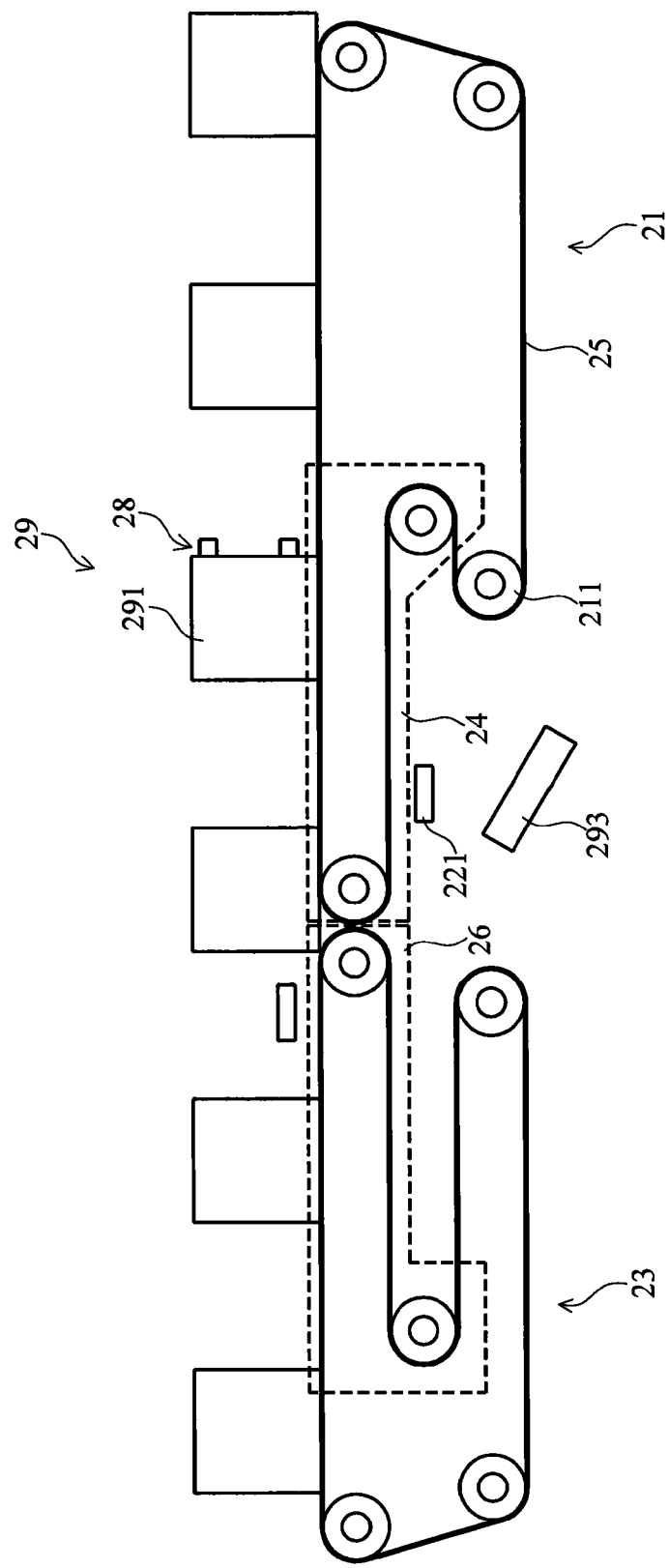

In one embodiment of the present invention, one first sensor unit 221 is set in the gap 22 to detect falling of each test product 29 from the first conveyor unit 21 into the gap 22 that has been examined by the examination unit 28 and judged to be a defective product 293, as shown in FIG. 4B. During application, the examination result of the examination unit 28 and the detection result of the first sensor unit 221 are used to control the relative positioning between the first movable wheel set 24 and the second movable wheel set 26. For example, when the first sensor unit 221 detected falling of one defective product 293 into the gap 22 and the examination unit 28 examines one next test product 29 to be a quality product 291, the first movable wheel set 24 is then moved toward the second movable wheel set 26 to deliver the quality product 291 to the second conveyor unit 23, as shown in FIG. 4C.

Figure 4D:
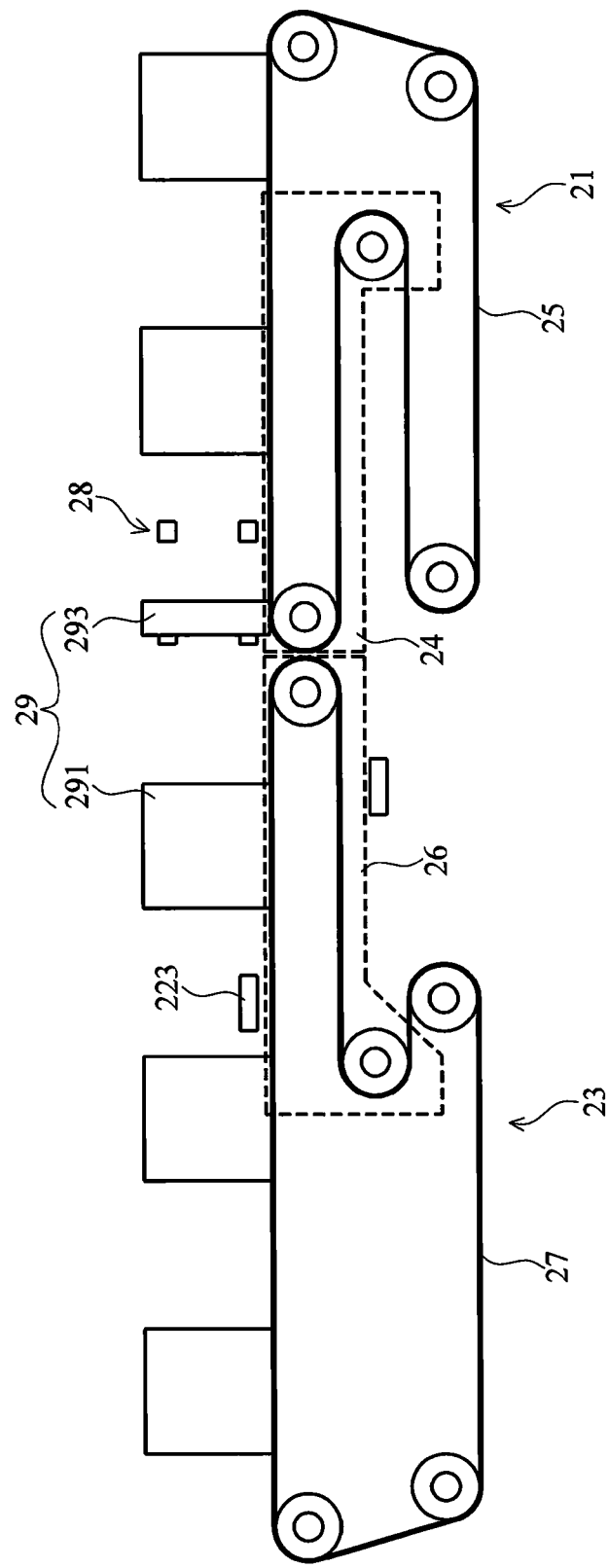

After first movable wheel set 24 and the second movable wheel set 26 have been connected, the second movable wheel set 26 and/or the first movable wheel set 24 is moved toward the first conveyor unit 21. At this time, the operation speed of the first conveyor belt 25 must match to the operation speed of the second conveyor belt 27. Further, during displacement of the first movable wheel set 24 and the second movable wheel set 26, the examination unit 28 keeps examining test products 29, as shown in FIG. 4D. In another application example, at least one second sensor unit 223 is provided above the second conveyor unit 23 to detect test products 29 being carried on the second conveyor unit 23. For example, when the second sensor unit 223 detects passing of one test product 29 that has been examined to be a defective product 291, the second movable wheel set 26 and/or the first movable wheel set 24 is moved toward the first conveyor unit 21.

Figure 4E:
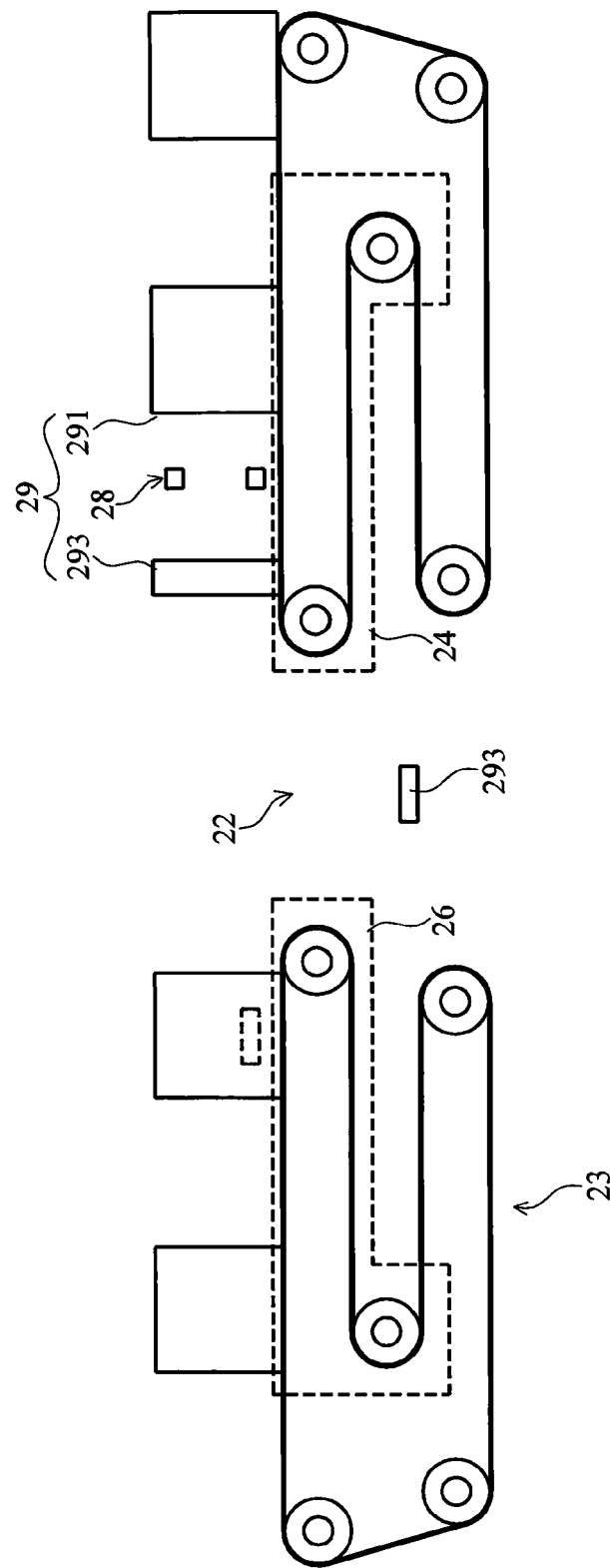

When the examination unit 28 examined a next test product 29 to be a defective product 293, the first movable wheel set 24 and the second movable wheel set 26 are moved relative to each other to provide a gap 22 between the first movable wheel set 24 and the second movable wheel set 26 for enabling this defective product 293 to fall into the gap 22. According to this application example, when one test product 29 is examined by the examination unit 28 to be a defective product 293, the second movable wheel set 26 will be moved toward the second conveyor unit 23, leaving a gap 22 between the first movable wheel set 24 and the second movable wheel set 26, as shown in FIG. 4E.

By means of repeating the aforesaid operation procedures, the screening examination system 20 delivers test products 29 and simultaneously examines and screens the delivering test products 29, achieving screening and examination of test products 29 efficiently. During application, the order of the aforesaid operation procedures may be changed subject to actual situations.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A screening examination system, comprising:
   a first conveyor unit receiving test products fed thereto at a first speed, said first conveyor unit comprising:
   a first drive wheel;
   a first tension wheel;
   a first fixed wheel;
   a first movable wheel set; and
   a first conveyor belt wound around said first drive wheel, said first tension wheel, said first fixed wheel and said first movable wheel set and rotatable to deliver test products upon rotation of said first drive wheel;
   a second conveyor unit, said second conveyor unit comprising:
   a second drive wheel;
   a second tension wheel;
   a second fixed wheel;
   a second movable wheel set; and
   a second conveyor belt wound around said second drive wheel, said second tension wheel, said second fixed wheel and said second movable wheel set and rotatable to carry test products from said first conveyor belt upon rotation of said first drive wheel;
   a first sensor unit arranged between said first conveyor unit and said second conveyor unit to detect falling of said test product between said first conveyor unit and said second conveyor unit, wherein as said first sensor unit detects falling of said test product, said first movable wheel set is moved to said second movable wheel set, and the position of said second movable wheel set is maintained;
   a second sensor unit arranged above said second conveyor unit to detect said test products being carried on said second conveyor unit, wherein as said second sensor unit detects passing of said test product, said second movable wheel set and said first movable wheel set is moved in direction toward said first conveyor unit;
   an examination unit arranged above said first movable wheel set to examine test products being delivered by said first conveyor unit and discriminate between a quality product and a defective product, wherein as said examination unit examines said defective product, said second movable wheel set is moved toward said second conveyor unit, and the position of said first movable wheel set is maintained;
   whereby movement of said first movable wheel set and said second movable wheel set are determined by the examination result of said examination unit and the detection results of said first and second sensor units; and,
   said first conveyor unit being adaptively varied to maintain a conveying speed different from the first speed responsive to the examination result.

2. The screening examination system as claimed in claim 1, wherein the position of said first tension wheel and the position of said second tension wheel are movable to adjust the tension of said first conveyor belt and the tension of said second conveyor belt respectively.

3. The screening examination system as claimed in claim 1, wherein said first movable wheel set comprises a first movable wheel and a third movable wheel; said second movable wheel set comprises a second movable wheel and a fourth movable wheel.

4. The screening examination system as claimed in claim 3, wherein said first movable wheel and said third movable wheel are spaced from each other at a fixed distance; said second movable wheel and said fourth movable wheel are spaced from each other at a fixed distance.

5. The screening examination system as claimed in claim 1, wherein said first conveyor unit and said second conveyor unit are arranged at one same elevation.

6. The screening examination system as claimed in claim 1, further comprising a test product feed unit connected to said first conveyor unit and adapted to deliver test products to said first conveyor unit for examination by said examination unit, and a quality product output unit connected to said second conveyor unit and adapted to receive from said second conveyor unit test products that passed the examination of said examination unit.

7. The screening examination system as claimed in claim 1, wherein said second movable wheel set moves in a direction toward said second conveyor unit to form a gap.

8. The screening examination system as claimed in claim 1, wherein said examination unit is adapted to examine the length, height and/or width of test products being delivered by said first conveyor unit.

9. The screening examination system as claimed in claim 8, wherein said examination unit includes a plurality of sensors.

10. A screening examination method used in a screening examination system, wherein said screening examination system comprises a first conveyor unit receiving test products fed thereto at a first speed and a second conveyor unit for receiving at least one test product from said first conveyor unit, the screening examination method comprising the steps of:
- operating said first conveyor unit to deliver test products, wherein said first conveyor comprises a first movable wheel set and said second conveyor comprises a second movable wheel set;
- operating an examination unit arranged above said first movable wheel set to discriminate one or more defective products from test products being delivered by said first conveyor unit;
- moving said second movable wheel set in direction toward said second conveyor unit, and keeping the position of said first movable wheel set;
- dropping said defective product into a gap between said first movable wheel set and said second movable wheel set;
- operating a first sensor unit arranged between said first conveyor unit and said second conveyor unit to detect said defective product dropping into said gap;
- operating said examination unit to discriminate one or more quality products from test products being delivered by said first conveyor unit;
- moving said first movable wheel set toward said second movable wheel set;
- keeping the position of said second movable wheel set;
- delivering said quality products from said first conveyor unit to said second conveyor unit;
- operating a second sensor unit arranged near said second conveyor unit to detect passing of said quality products being carried on said second conveyor unit;
- moving said first movable wheel set and said second movable wheel set together in a direction toward said first conveyor unit;
- whereby movement of said first movable wheel set and said second movable wheel set are determined by the examination result of said examination unit and the detection results of said first and second sensor units; and,
- adaptively varying said first conveyor unit to maintain a conveying speed different from the first speed responsive to the examination result.

11. The screening examination method as claimed in claim 10, wherein said second sensor unit is arranged above said second conveyor unit.

* * * * *